3,095,457
METHOD FOR PREPARING BIS(2-ALKOXYETHYL) SULFONES
Charles H. Chang, Easton, Pa., assignor to General Aniline & Film Corporation, New York, N.Y., a corporation of Delaware
No Drawing. Filed Dec. 29, 1961, Ser. No. 163,061
8 Claims. (Cl. 260—607)

This invention relates to a new chemical process, and more particularly to a new method for preparing a bis (2-alkoxyethyl) sulfone.

A number of methods have been previously proposed for the preparation of bis (2-alkoxyethyl) sulfones, most of which involve the use of toxic and skin vesicant starting materials such as divinyl sulfone, 2-haloethyl vinyl sulfones, bis(haloethyl) sulfones, and the like. Other previously proposed methods are likewise disadvantageous for one or more reasons, including unduly high costs, difficulty in control, etc.

It is an object of this invention to provide a method for preparing a bis (2-alkoxyethyl) sulfone which will not be subject to one or more of the above disadvantages. Other objects and advantages will appear as the description proceeds.

The attainment of the above objects is made possible by this invention which broadly includes reacting 1 mole of 2,2'-sulfonyldiethanol with 2 moles of an alkanol at an elevated temperature in the presence of a member of the group consisting of alkali metal hydroxides and alkoxides. This process has been found to be simple and economical to carry out. Its operativeness is highly surprising since the etherification of alcohols is normally an acid-catalyzed reaction. It was accordingly highly surprising to discover that the claimed reaction, which is base-catalyzed, is effective and highly desirable for the attainment of the desired results.

The alkanol employed in the claimed etherification reaction may be a straight or branched, saturated or unsaturated, substituted or unsubstituted alkanol containing from 1 to 18 carbon atoms or more. The preferred alkanols are the lower molecular weight monohydric alcohols containing about 1 to 5 carbon atoms such as methyl, ethyl, and normal and isomeric propyl, butyl, and amyl alcohol. Higher alcohols may be employed including lauryl alcohol, stearyl alcohol, the highly branched chain aliphatic monohydric primary alcohols such as tridecyl alcohol as produced by the Oxo process from branched chain olefins such as di-, tri-, and tetrapropylene, -butylene, -isobutylene, and the like. The alcohol may be unsaturated, as for example allyl and oleyl alcohol, and/or primary, secondary or tertiary. Further, the aliphatic chain of the alcohol may be interrupted by one or more hetero atoms or groups such as O, S, NR and the like, where R is an alkyl of 1 to 16 or more carbon atoms or an aryl such as phenyl, as for example, the monoalkylethers of ethylene glycol, diethylene glycol, propylene glycol, butylene glycol, diethanol sulfide, diethanol ethylamine, N,N'-diethanol-N,N'-dipropylethylenediamine, and the like. The alkanol may contain other inert substituents, the essential requirement being that it contain a single OH group bonded to a carbon atom as the sole reactive-hydrogen containing group.

The action is carried out in the presence of a hydroxide or alkoxide of an alkali metal such as sodium, potassium, or lithium. The hydroxide is preferably added in anhydrous form although it may contain some water which would be removed from the reaction medium together with the water of condensation. The alkoxides employed are actually the alkali metal salts of the alkanol employed in the reaction and are conveniently formed in situ in the reaction medium by addition thereto of the alkali metal in free elemental form. The alkali metal hydroxide or alkoxide may be employed in catalytic amounts, as for example from about 0.03 to 0.08 mole per mole of the 2,2'-sulfonyldiethanol although up to equivalent amounts may be employed i.e. up to 2 moles per mole of the 2,2'-sulfonyldiethanol.

The reaction is carried out at an elevated temperature, e.g. at least about 50° C., reflux temperatures being preferred. The reaction is accelerated by elevated temperatures and/or by removal of the water of condensation as it is formed. With the low boiling alkanols of 1 to 3 carbon atoms, superatmospheric pressure is advantageous. With the higher boiling, water immiscible alcohols of at least 4 carbon atoms, the reaction may be carried out above the boiling point of water with continuous removal of the water of condensation, although this is not particularly efficient or desirable. The preferred method when employing alkanols of at least 4 carbon atoms is to add to the reaction medium a water immiscible hydrocarbon which forms an azeotrope with water, preferably having a boiling point below that of the alkanol. As examples of such hydrocarbons, there may be mentioned aromatic hydrocarbons such as benzene, toluene, xylene and the like, and aliphatic hydrocarbons such as pentane, hexane, and the like. In such case, the reaction is carried out under reflux using known means for returning the reactants to the reaction vessel and known means for removing and condensing the azeotropic mixture of hydrocarbon and water of condensation and recycling the condensed hydrocarbon back to the reaction mixture. A hydrocarbon is preferably employed which boils below the boiling point of the alkanol employed and which forms an azeotrope with water boiling at a still lower temperature.

In carrying out the reaction the reactants may be employed in stoichiometric proportions although it is preferred to employ an excess of up to 25 or more moles of the alkanol per mole of the 2,2'-sulfonyldiethanol which excess favors completion of the reaction and complete utilization of the 2,2'-sulfonyldiethanol reactant. There is a pronounced tendency for some thioxane dioxide to be formed during the reaction by cyclization of the 2,2'-sulfonyldiethanol with elimination of a mole of water, but the thioxane dioxide is likewise converted to the corresponding bis(2-alkoxyethyl) sulfone by means of the same reaction in the presence of an alkali metal hydroxide or alkoxide and is therefore to be considered equivalent to the 2,2'-sulfonyldiethanol for the purposes of this invention.

The bis(2-alkoxyethyl) sulfones produced by the process of this invention are effective agents for improving the wash-and-wear, dry and wet crease resistance of fibrous materials, particularly cellulose textile materials. For such purpose, such sulfones may be applied to the fibrous material from an aqueous medium followed by drying and curing the treated fibrous material in the presence of an alkaline catalyst such as sodium or potassium hydroxide, carbonate or bicarbonate or the like, at an elevated temperature of 220 to 475° F. or the like.

The following examples are only illustrative of this invention and are not to be regarded as limitative. All parts and proportions referred to herein and in the appended claims are by weight unless otherwise indicated.

*Example 1*

Into a three-necked flask containing 7 g. of metallic sodium dissolved in 150 ml. of methyl alcohol is added 23 g. of 2,2'-sulfonyldiethanol. The reaction mixture is refluxed with stirring for about 60 hours and then acidified slightly with acetic acid. The resulting mixture is then evaporated under reduced pressure on a steam bath to remove the unreacted alcohol. The residue is mixed with 150 ml. of ether, filtered and the filter cake of sodium acetate washed with ether. The filtrate containing bis(2-methoxyethyl) sulfone is concentrated and distilled. Yield, 20 g. (73.2%).

*Example 2*

The procedure of Example 1 is repeated except that only 0.3 g. of metallic sodium is employed, and the amount of 2,2'-sulfonyldiethanol increased to 30.8 g. The reaction time is 48 hours and the yield of bis (2-methoxyethyl) sulfone is 27 g. (74%). 4.8 g. (17.6%) of thioxane dioxide is obtained by extraction of the filter cake with hot benzene.

*Example 3*

The procedure of Example 2 is repeated except that 2 g. of NaOH, anhydrous, is employed instead of the metallic sodium. The reaction time is 42 hours and the yield of bis (2-methoxyethyl) sulfone is 25 g. (68.6%), in addition to 7 g. (25.7%) of thioxane dioxide.

*Example 4*

The procedure of Example 2 is repeated except that the methyl alcohol is replaced by ethyl alcohol. The reaction time is 22 hours, the yield of bis (2-ethoxyethyl) sulfone is 27 g. (65.8%) and of thioxane dioxide 6.5 g. (23.9%).

*Example 5*

The procedure of Example 2 is repeated except that the methyl alcohol is replaced by n-butyl alcohol. The reaction time is 5 hours, the yield of bis (2-butoxyethyl) sulfone is 31 g. (58.2%), and of thioxane dioxide 10 g. (36.7%).

*Example 6*

Into a three-necked flask containing 0.8 g. of metallic sodium dissolved in 150 ml. of n-butyl alcohol is added 100 ml. of benzene and 30.8 g. of 2,2'-sulfonyldiethanol. The reaction mixture is azeotroped with stirring using a water separator for 2.5 hours and then acidified slightly with acetic acid. The resulting mixture is worked up as described in Example 1 above, resulting in a yield of 42 g. (78.9%) of the bis (2-butoxy ethyl) sulfone and 2 g. (7.3%) of thioxane dioxide.

*Example 7*

The procedure of Example 6 is repeated except that n-butyl alcohol is replaced by n-amyl alcohol, resulting in a yield of 51 g. (86.7%) of the bis (2-amyloxyethyl) sulfone and 0.2 g. (0.7%) of thioxane dioxide.

This invention has been disclosed with respect to certain preferred embodiments and it is to be understood that various modifications and variations thereof obvious to a person skilled in the art are to be included within the spirit and purview of this application and the scope of the appended claims.

I claim:

1. A method for preparing a bis(2-alkoxyethyl) sulfone comprising reacting 1 mole of 2,2'-sulfonyldiethanol with 2 moles of an alkanol at an elevated temperature in the presence of a member of the group consisting of alkali metal hydroxides and alkoxides.

2. A method as defined in claim 1 wherein said alkanol contains about 1 to 5 carbon atoms.

3. A method as defined in claim 1 carried out under reflux.

4. A method as defined in claim 1 carried out under superatmospheric pressure.

5. A method as defined in claim 1 carried out while removing from the reaction mixture the water of condensation.

6. A method for preparing a bis(2-alkoxyethyl) sulfone comprising refluxing a mixture containing
    (1) 2,2'-sulfonyldiethanol,
    (2) a water insoluble alkanol in a molar amount at least twice that of the 2,2'-sulfonyldiethanol,
    (3) a member of the group consisting of alkali metal hydroxides and alkoxides, and
    (4) a water insoluble liquid aromatic hydrocarbon capable of forming an azeotropic mixture with water, removing and condensing the azeotropic mixture of aromatic hydrocarbon and water of condensation, and recycling the condensed aromatic hydrocarbon to the reaction mixture.

7. A method as defined in claim 6 wherein said alkanol contains at least 4 carbon atoms.

8. A method as defined in claim 6 wherein said aromatic hydrocarbon is selected from the group consisting of benzene, toluene and xylene.

References Cited in the file of this patent

Cashmore: J. Chem. Soc. (London) 123, 1738–45 (1923).

Notice of Adverse Decision in Interference

In Interference No. 95,183 involving Patent No. 3,095,457, C. H. Chang, METHOD FOR PREPARING BIS(2-ALKOXYETHYL) SULFONES, final judgment adverse to the patentee was rendered Apr. 22, 1968, as to claims 1, 3 and 5.

[*Official Gazette September 24, 1968.*]